Sept. 16, 1924.
P. A. EFTOFIE
TIRE ARMOR
Filed Feb. 18, 1924
1,508,877
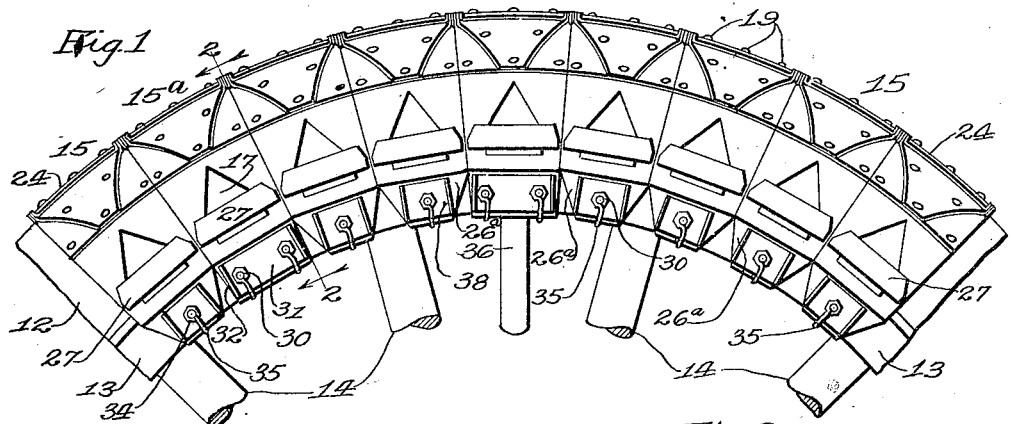
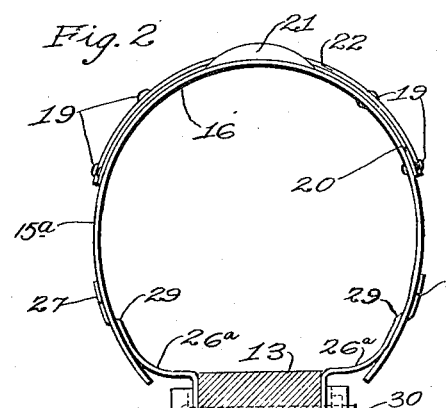
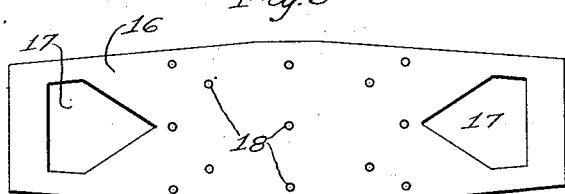
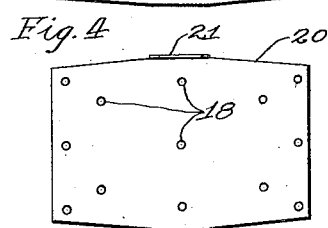
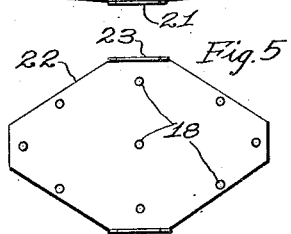
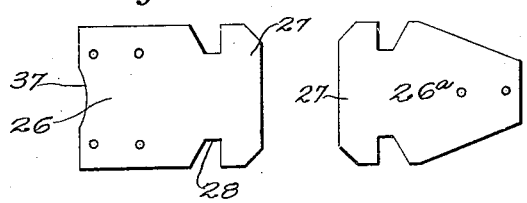
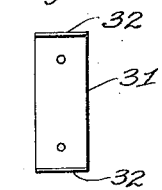
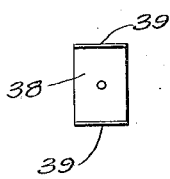
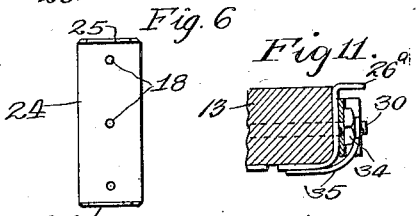
Inventor
Preda. A. Eftofie
By Chas. O. Tillman
Atty.

Patented Sept. 16, 1924.

1,508,877

UNITED STATES PATENT OFFICE.

PREDA A. EFTOFIE, OF CHICAGO, ILLINOIS.

TIRE ARMOR.

Application filed February 18, 1924. Serial No. 693,499.

*To all whom it may concern:*

Be it known that I, PREDA A. EFTOFIE, a subject of the King of Rumania, residing at Chicago, in the county of Cook and State of Illinois, have invented certain new and useful Improvements in Tire Armor, of which the following is a specification.

This invention relates, generally, to means for the protection of the tires of vehicle wheels, but particularly to such means for the protection of the tires of the automobiles, and it consists in certain peculiarities of the construction, novel arrangement and combination of the various parts thereof as will be hereinafter more fully set forth and specifically claimed.

The principal object of the invention is, to furnish a protector or armor for tires, which shall be strong, durable and highly efficient in not only protecting tires against wear, injury, and punctures, incident to their contact with rocks, gravel, pointed objects, and the like on the surface of roads, but also to furnish a protector which shall have a base or tread portion of such construction as to create resistance to the road surface in any kind of weather, thereby preventing skidding and rendering use of chains for such purpose unnecessary.

Another object of the invention is the provision of a protector of such construction and arrangement of its parts, as to completely cover the entire tire with a series of sectional bandages, by preference of metal, parts of each of which shall have relative movement towards and from one another, thus rendering them self-adjusting with respect to the variations in the size of portions of the tire, due to the stress to which it is subjected in travel, and with respect to each other.

Other objects and advantages of the invention will be disclosed in the following explanation and description, which will be more readily understood when read in conjunction with the accompanying drawing, in which one embodiment of which the invention is susceptible is illustrated, it being understood that modifications and changes may be resorted to so long as they come within the scope of the appended claims.

In the drawing,—

Fig. 1 is a view in side elevation, of a portion of a wheel and tire of an automobile showing a portion of an armor or protector embodying my improvements in the position on the tire which it will occupy when in use.

Fig. 2 is an end view of one of the bandages or sectional envelopes for the tire taken on line 2—2 of Fig. 1 looking in the direction indicated by the arrows.

Figs. 3 to 10 inclusive are separated face views of the parts or elements comprising each of the tubular sections of the protector, and Fig. 11 is a view partly in section and partly in elevation of a portion of the felly of the wheel and a part of the armor, showing a means for securing the latter to the felly.

Corresponding numerals of reference refer to like parts throughout the different views of the drawing.

Referring now more particularly to Figs. 1 and 2 of the drawing, the reference numeral 12 designates a portion of a tire casing of the ordinary kind used in pneumatic tires for automobiles and the like. This tire casing, which may be provided therein with a pneumatic tube, is mounted in the ordinary manner on the rim, not shown of the wheel, the rim being mounted on the felly, which felly is supported by means of spokes 14 in the usual or any well known way on the hub of the wheel.

It will be understood by reference to Fig. 1 that while a portion only of the tire is illustrated, and said part only equipped with the protector, the entire tire will be so equipped. The protector consists of a plurality of sections or tubular bands or bandages which are designated as a whole by the reference numerals 15 and 15ª and abut at their ends against each other as is clearly disclosed in Fig. 1 of the drawing. Each of these protecting bands consists of a main plate of sheet metal 16 of about the shape shown in Fig. 3 and of a size to fit around the tire 12 in such a way that when bent to conform to the shape of the tire as shown in Fig. 2, its ends will approach or be located adjacent the sides of the felly 13 yet at sufficient distance therefrom to prevent said ends striking the felly or parts of the protector mounted on the felly. The plate 16 is provided near each of its ends with an angular opening 17, the acute angle of each of said openings being directed towards the other opening, said openings being for the purpose to be presently explained.

The plate 16 of each of the tubular members 15 is provided with a series of rivet holes 18 arranged in spaced relation to one another for the reception of rivets 19 employed for securing reinforcing members or plates on the tread portion of the protector and also for engaging the surface of the road in such a way as to create resistance and thereby prevent slipping or skidding.

By again referring to Fig. 1 of the drawing, and particularly to the left and middle portions thereof, it will be seen that some of the sections are arranged in groups of three sections between the axial lines of each adjacent pair of spokes, and that the intermediate section 15ª of each group or rather the inner portion thereof, is of different construction from similar portions of the sections 15 at each end of the intermediate section, which construction will be pointed out in the following description. Each of the main plates 16 has mounted on its upper surface a reinforcing plate 20, see Fig. 4, which has at the middle of each of its side edges a flange 21 extended outwardly as shown in Fig. 2 of the drawing.

Mounted on the outer surface of the reinforcing plate 20 is another reinforcing plate 22 preferably of the shape shown in Fig. 5, which also has at its side edges an outwardly extended flange 23 to fit between the flanges 21 on the plate 20. Mounted on the outer surface of the reinforcing plate 22 is a reinforcing bar or piece 24, which has at its ends outwardly extended flanges 25 to fit between the flanges 23 of the plate 22. The projections 21 on the plate or member 20 are located at the middle of the side edges of said plate, and the projections 23 on the member 22 are located at the edges of said member at about their longitudinal middle, and said plate is of sufficient size when laid on top of the plate 20, to permit the projections 23 to be interposed between the projections 21 of the plate 20 and in juxtaposition with the last named projections. The member 24 is located transversely with respect to the plate 22 and has openings 18 to register with similar openings 18 in the plates 20 and 22 for the reception of the rivets or bolts 19 used as before stated for securing the plates together and for providing a roughened or gripping surface to contact with the surface of the road. The openings 18 in the plates shown in Figs. 3 to 5 inclusive are so arranged as to register with one another, while the openings in the member 24 shown in Fig. 6 are arranged to register with the central row of such openings in the other plates so that said plates may be readily secured together and in a very secure manner.

The plate 16 as well as the reinforcing plates are made of slightly resilient material so that they may be bent to about the shapes shown in Fig. 2, in which shape it is obvious that the ends of the main plate 16 can be sprung sufficiently to readily stride the tire casing. On each of the intermediate sections of each of the above mentioned group of three sections, a connecting member 26 of the form shown in Fig. 7 and having a T-shaped head 27 is employed for connecting the ends of the main plate 16 to the felly 13 of the wheel. One of these connecting members has its T-shaped head extended from the inner surface of the plate 16 outwardly through each of the openings 17 in said plate so that the neck 28 of said head will rest between the side walls at the outer end of each of the openings 17, while the head 27 will rest on the outer surface of the plate 16 across the opening 17 therein as is clearly shown in Figs. 1 and 2 of the drawing. In order to effect this disposition of the parts, the head 27 is offset as at 29, see Fig. 2 of the drawing, so that it will lie close to the outer surface of the plate 16 and across the opening 17 therein. The connecting members 26 are secured to the felly by bolts 30 extended transversely therethrough. A washer or reinforcing plate 31 having an outwarly extended flange 32 at each of its ends, see Fig. 9, is located on the outer surface of that portion of each of the connecting members 26 resting against the sides of the felly and the bolts 30 are extended through openings in the members 26 and plates 31 as will be readily understood by reference to Figs. 1, 2, 7, and 9 of the drawing. A nut 34 engages one end of each of the bolts 30 so as to hold the connecting members 26ª securely against the sides of the felly and said nuts may be locked in place by means of a wire 35 fastened at one of its ends around the bolt 30 outwardly of the nut at one of its ends and secured at its other end to one of the connecting members 26ª at its edge adjacent to the other connecting member, as is clearly shown in Fig. 11 of the drawing.

As it is necessary to provide means for the insertion of the stem 36 of a valve through the felly, for inflating the tire, the connecting members 26 of the intermediate sections or bands of each group are provided at their adjacent edges on the felly with cut-away portions 37, see Fig. 7, to prevent said connecting members interfering with the said valve stem.

Each of the outer sections or tabular bands of each group of sections is of the same construction as illustrated in Fig. 2 and just above described, with the exception that the connecting members 26 of the construction shown in Figs. 2 and 7 are substituted by connecting members 26ª of the form shown in Fig. 8, in which it will be observed that that portion of the connecting member opposite the head 27 thereof is outwardly tapered and the cut-away portion 37 of the other form of connecting members is omitted for the reason it is not required in the outer sections of each of said groups of sections, and consequently, the edges of the connecting members 26ª on the felly may be brought into contact with one another or very close together. A washer or reinforcing plate 38, see Figs. 1 and 10, having an outwardly extended flange 39 at each of its ends and provided centrally with an opening, is located on that portion of each of the members 26ª resting against the sides of the felly and held in place by means of a bolt 30, nut 34, and tie wire 35 as in the other construction.

From the foregoing and by reference to the drawing, especially to Fig. 2 thereof, it will be readily understood that in the travel of the wheel of the vehicle or automobile, the tread portion of the protector or rather the reinforced main plate 16 of each section will be caused, on account of the stress or force to which they are subjected, to move towards the felly, and as the connecting members 26 and 26ª uniting the plates or portions 16 to the felly are loosely connected to the members 16, as just above set forth, it is apparent that the sections or bands will adjust themselves to the tire.

By my improvements, it is obvious that a protector which is practically indestructible, is provided, and that by its use the life of tires may be extended indefinitely.

Having thus fully described my invention, what I claim as new and desire to secure by Letters Patent is:

A protector for tires consisting of a plurality of arcuate metal sections or bands located in juxtaposition on the tread portion of a tire embracing the same with their free ends disposed inwardly near the sides of the wheel felly and each having an opening therein, a plurality of reinforcing plates mounted on the tread portion of each of said sections or bands and having outwardly extended projections to create resistance against the road surface, and an outwardly extended member secured to each side of said felly and interlockingly engaging each of said sections for radial movement of the latter.

PREDA A. EFTOFIE.